(12) United States Patent
Paulraj et al.

(10) Patent No.: US 12,411,467 B2
(45) Date of Patent: Sep. 9, 2025

(54) SYSTEM AND METHOD FOR MANAGING UNAVAILABILITY OF MANAGEMENT COMPONENTS

(71) Applicant: Dell Products L.P., Round Rock, TX (US)

(72) Inventors: Deepaganesh Paulraj, Bangalore (IN); Akkiah Choudary Maddukuri, Austin, TX (US); Donald W. Gerhart, Leander, TX (US); Balamurugan Gnanasambandam, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 454 days.

(21) Appl. No.: 18/047,834

(22) Filed: Oct. 19, 2022

(65) Prior Publication Data

US 2024/0134332 A1 Apr. 25, 2024
US 2024/0231297 A9 Jul. 11, 2024

(51) Int. Cl.
G05B 19/042 (2006.01)

(52) U.S. Cl.
CPC .. G05B 19/042 (2013.01); *G05B 2219/50333* (2013.01)

(58) Field of Classification Search
CPC .................. G05B 19/042; G05B 2219/50333
USPC ........................................................ 700/300
See application file for complete search history.

(56) References Cited

U.S. PATENT DOCUMENTS

| | | | |
|---|---|---|---|
| 6,389,817 B1 * | 5/2002 | Smith | F25B 21/04 62/3.2 |
| 7,698,095 B2 | 4/2010 | Chung et al. | |
| 8,550,702 B2 | 10/2013 | Campbell et al. | |
| 9,581,985 B2 | 2/2017 | Walser et al. | |
| 9,772,664 B1 | 9/2017 | Chou et al. | |
| 9,785,208 B2 | 10/2017 | Lovicott et al. | |
| 9,820,411 B2 | 11/2017 | Alshinnawi et al. | |
| 9,842,003 B2 | 12/2017 | Rao et al. | |
| 9,968,011 B2 | 5/2018 | Shabbir et al. | |
| 10,156,987 B1 | 12/2018 | Gutierrez et al. | |
| 10,191,523 B2 | 1/2019 | Shows et al. | |
| 10,394,294 B2 | 8/2019 | Pfeifer et al. | |
| 10,712,033 B2 | 7/2020 | Atchison et al. | |
| 10,760,809 B2 | 9/2020 | Gillette et al. | |
| 11,009,249 B2 | 5/2021 | Goel et al. | |
| 2009/0198387 A1 * | 8/2009 | Lin | G06F 1/26 713/2 |
| 2013/0015548 A1 | 1/2013 | Chen et al. | |
| 2014/0027435 A1 | 1/2014 | Chou | |

(Continued)

*Primary Examiner* — Jigneshkumar C Patel
(74) *Attorney, Agent, or Firm* — WOMBLE BOND DICKINSON (US) LLP

(57) ABSTRACT

Methods and systems for managing the operation of data processing systems are disclosed. A data processing system may include a computing device that may provide computer implemented services. To provide the computer implemented services, hardware components of the data processing system may need to operate in predetermined manners. To manage the operation of the hardware components, the data processing system may heat them when their temperatures fall outside of thermal operating ranges. To manage the hardware components when heating is unavailable, the data processing system may proactively heat them to elevated goal temperature ahead of periods of time when heating is unavailable.

20 Claims, 6 Drawing Sheets

(56) References Cited

U.S. PATENT DOCUMENTS

| | | | |
|---|---|---|---|
| 2020/0286804 A1* | 9/2020 | Fallin | H01L 23/345 |
| 2021/0103305 A1* | 4/2021 | Nikazm | G05D 23/1928 |
| 2023/0086310 A1* | 3/2023 | Utz | G06F 1/182 |
| | | | 700/202 |
| 2023/0260864 A1* | 8/2023 | Kondapuram | H05B 1/023 |
| | | | 713/2 |

* cited by examiner

SYSTEM AND METHOD FOR MANAGING UNAVAILABILITY OF MANAGEMENT COMPONENTS

FIELD OF THE EMBODIMENTS

Embodiments disclosed herein relate generally to device management. More particularly, embodiments disclosed herein relate to systems and methods for retaining temperatures of components within operating temperature ranges while heating is unavailable.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1A:
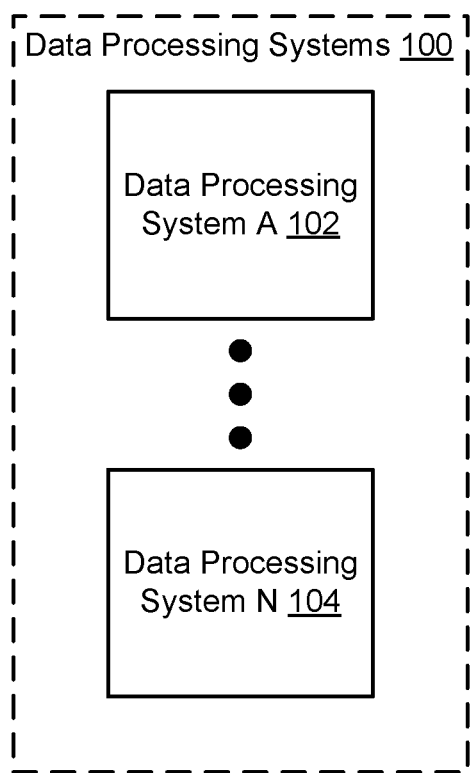
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices.

In general, embodiments disclosed herein relate to methods and systems for managing the operation of data processing system. The data processing system may provide computer implemented services.

To provide the computer implemented services the data processing system may include various hardware components. The hardware components may have thermal operating limits that must be met for the hardware components to operate nominally (e.g., with low probability of error, low chance of damage/failure, etc.).

To maintain the hardware components within the thermal operating limits, the data processing system may include a thermal management subsystem. The thermal management subsystem may include a heater that may generate heat to warm some of the hardware components when they are below their thermal operating limits.

To manage the operation of the heater, the thermal management subsystem may include a thermal manager. The thermal manager may be tasked with managing the operation of the heater. However, during various periods of time, the thermal manager may be inoperable (e.g., during firmware updates, restarts, etc.). During these periods of time, to avoid risk, operation of the heater may be disabled.

To proactively mitigate the impact of unavailability of heating during periods of time when the thermal manager is inoperable, the data processing system may elevate the temperatures of the hardware components ahead of the periods of time when heating will be unavailable. By doing so, it may be more likely that the hardware components stay within their thermal operating limits and are able to continue to operate even while heating is unavailable and after heating is restored.

By doing so, embodiments disclosed herein may provide a data processing system capable of operating under a wider array of environment conditions by mitigating (e.g., reducing, limiting, etc.) the impact of environmental conditions in which the data processing system resides. Thus, embodiments disclosed herein may address the technical problem of operating condition limitations of data processing systems. The disclosed embodiments may address this problem by providing a data processing system with active heating capabilities that are used proactively ahead of periods of time when the heating capabilities may be unavailable.

In an embodiment, a data processing system that provides computer implemented services is provided, the data processing system may include zones, each zone of a portion of the zones may include: a payload comprising hardware components that contribute to providing the computer implemented services, a heater positioned to selectively warm the payload, and a temperature sensor positioned to identify a temperature of the zone; and a management controller adapted to: identify a future unavailability of heating for the zones by the heater of each zone; based on the future unavailability of the heating: identify an elevated goal temperature for each of the zones to obtain elevated goal temperatures; prior to the future unavailability of the heating, warm each zone of the zones to a corresponding elevated goal temperature of the elevated goal temperatures; after warming the zones, allow the future unavailability of the heating to proceed; and after the unavailability of the heating ends, set goal temperatures for each of the zones for steady state operation.

The data processing system may also include a thermal manager adapted to: control the operation of the heater of each zone of the portion of the zones; and facilitate software updates to modify a manner in which operation of the heater of each zone of the portion of the zones is managed. An instance of facilitating the software updates may cause the unavailability of the heating for the zones.

The management controller may be unable to directly control the operation of the heater of each zone of the portion of the zones.

Warming each zone of the zones may include providing, to the thermal manager, instructions to warm each of the zones to the corresponding elevated goal temperature of the elevated goal temperatures.

The management controller may also be adapted to: during the unavailability of the heating, selectively implement, using the hardware components, operations to attempt to reduce an impact of cooling of the hardware components on the computer implemented services provided by the data processing system.

Identifying the elevated goal temperature for each of the zones to obtain the elevated goal temperatures may include identifying an ambient temperature; identifying the payload each zone of the portion of the zones; identifying a likely duration of the future unavailability of the heating for the zones; identifying a likely level of cooling of each of the zones based on the ambient temperature, the identified payloads, and the likely duration of the future unavailability of the heating for the zones; and identifying an elevated goal temperature for each zone based on a current temperature of the zone of the zones and a corresponding identified likely level of cooling for the zone of the zones.

Each of the elevated goal temperatures may be higher temperatures than the goal temperatures for each of the zones for steady state operation, and a level of elevation of each of the elevated goal temperature selected to retain a temperature in a corresponding zone of the zones within thermal operating ranges of hardware components of the payload in the corresponding zone while the hardware components cool during the unavailability of the heating.

In an embodiment, a computer-implemented method is provided. The computer-implemented may provide the functionality of the data processing system and/or components thereof, discussed above.

In an embodiment, a non-transitory media is provided. The non-transitory media may include instructions that when executed by a processor cause the computer-implemented method to be performed.

Turning to FIG. 1A, a block diagram illustrating a system in accordance with an embodiment is shown. The system shown in FIG. 1 may provide any quantity and type of computer implemented services. To provide the computer implemented services, the system of FIG. 1 may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may need to operate in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system and/or other type of management entity that facilitates execution of applications.

To perform the startup process and provide the computer implemented services, data processing systems 100 may include various hardware components (e.g., integrated circuit-based devices). The hardware components may perform various types of functionalities including, for example, (i) data processing functionality through which the computer implemented services may be provided, (ii) system management functionality through which the operation of the respective data processing systems may be managed, and/or (iii) other types of functionalities.

Any of the hardware components may have limitations on their operation. For example, any of the hardware components may have limitations regarding their temperatures (e.g., hardware components having such limitations being referred to as "temperature sensitive hardware components"). The temperature limitations may include a lower temperature limit and an upper temperature limit. If the temperature of a temperature sensitive hardware components is outside of these limitations, then the temperature sensitive hardware components may be impaired (e.g., may not operate, may operate but in an undesirable manner such as including errors in their operation, may be subject to damage if operated, etc.).

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may include functionality to warm and cool hardware components.

For example, data processing systems 100 may include heaters, fans, and/or other types of components for heating and/or cooling. The heaters and fans may be used to generate flows of gasses. The flows of gasses may be heated by a heater, and/or obtained from a source of cool gas (e.g., an ambient environment, a gas temperature management system, etc.) to provide for warming and/or cooling flows of gasses usable to warm or cool temperature sensitive hardware components.

To decide when and how to generate flows of gasses to warm or cool hardware components, data processing systems 100 may implement a distributed management framework. The distributed management framework may include multiple management components tasked with cooperatively managing the thermal environment of the data processing system. However, due to limitations in the operations of the management components, the management components may not always be capable of managing the operation of heaters, fans, and/or other types of devices.

For example, consider a scenario where a management components is implemented with a programmable device that is tasked with managing the operation of heaters. The programmable device may need to be updated from time to time. During periods of time where the operation of the programmable device is being updated, the programmable device may not be able to manage the operation of the heaters. Unmanaged operation of heaters may potentially lead to catastrophic failure modes (e.g., fires). Consequently, when management components tasked with managing the operation of the heaters are unable to manage the heaters, the operation of the heaters may be disabled, disallowed, and/or otherwise limited to reduce the likelihood of catastrophic failure modes. Thus, during various periods of time, heating for temperature sensitive hardware components may be unavailable.

To reduce the impact of periods of time when heating is unavailable, data processing systems 100 may act ahead of the periods of time to reduce the impact of the unavailable of the heating on the operation of data processing systems 100. For example, data processing systems may (i) estimate a likely impact of the heating unavailability on various hardware components, (ii) identify elevated goal temperatures for the hardware components that may improve the likelihood of the hardware components being maintained within their thermal operating ranges while the heating is unavailable, (iii) warm the hardware components based on the elevated goal temperatures in advance of the periods of time, (iv) disable heating during the periods of time when a management component tasked with managing the heating is unavailable, and (v) return the goal temperatures for the hardware components to meet steady state operation expectations. The management component that will become unavailable may use the goal temperatures to proactively mitigate the threat presented by periods of time when heating is unavailable to the unavailability of operation of the management component.

Figure 1B:
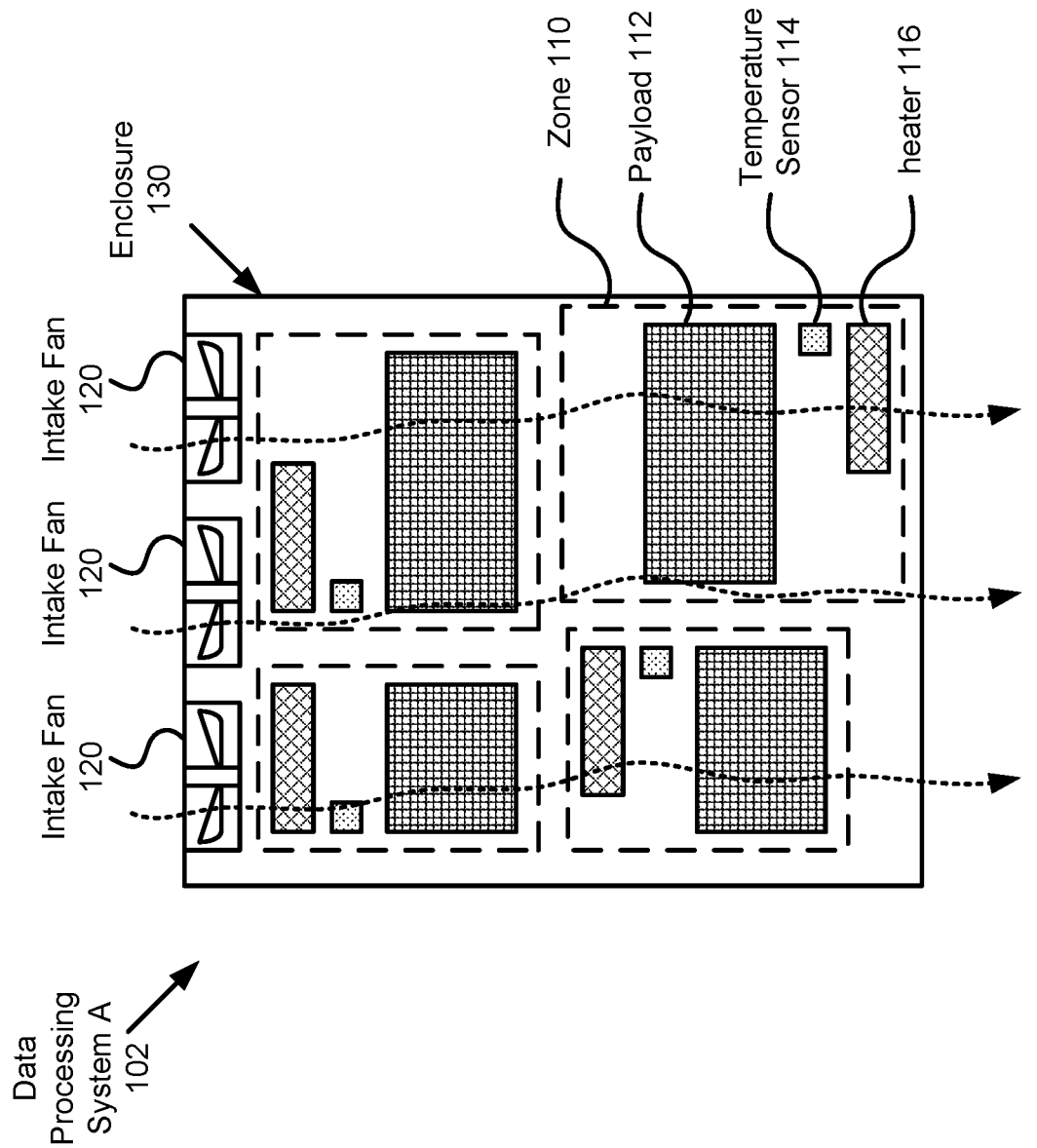
FIG. 1B shows a top view diagram illustrating gas flow in a data processing system in accordance with an embodiment.
Figure 1C:
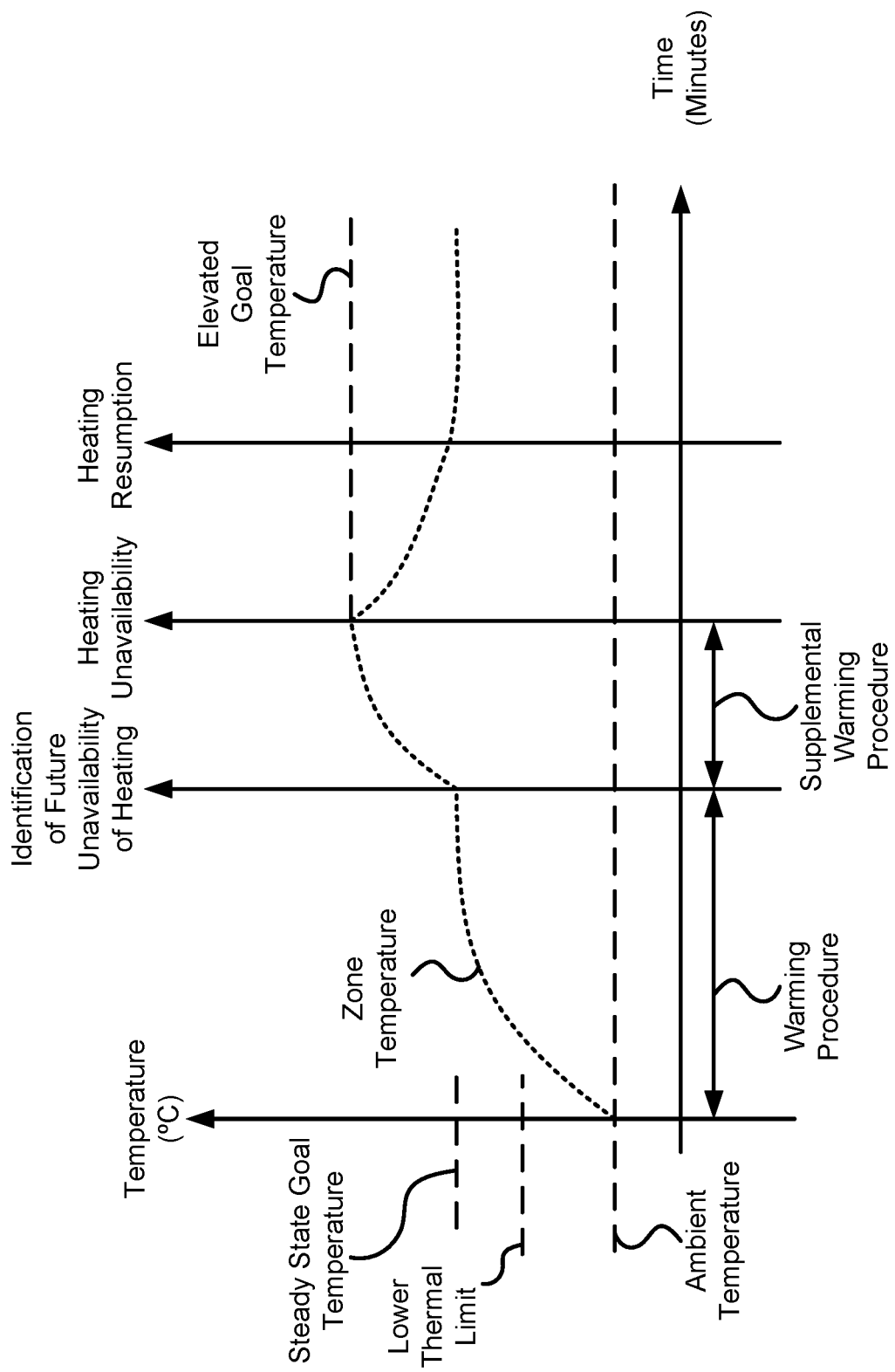
FIG. 1C shows a plot of a temperature in accordance with an embodiment.

Refer to FIGS. 1B-1C for additional details regarding maintaining hardware components of data processing systems 100 within their thermal operating ranges during periods of time when heating is unavailable.

By doing so, a data processing system in accordance with an embodiment may be more likely to successfully place itself in condition to provide desired computer implemented services under a wider variety of operating conditions. Thus, embodiments disclosed herein may address the technical challenge of limited operating conditions of components of data processing systems. The disclosed data processing systems may represent an improvement in computing technology by being more likely to successfully operate in varying operating conditions, and, in particular, an environment where ambient conditions (e.g., temperatures below the thermal operating ranges of the components) may otherwise preclude operation of components of data processing systems 100.

Figure 2:
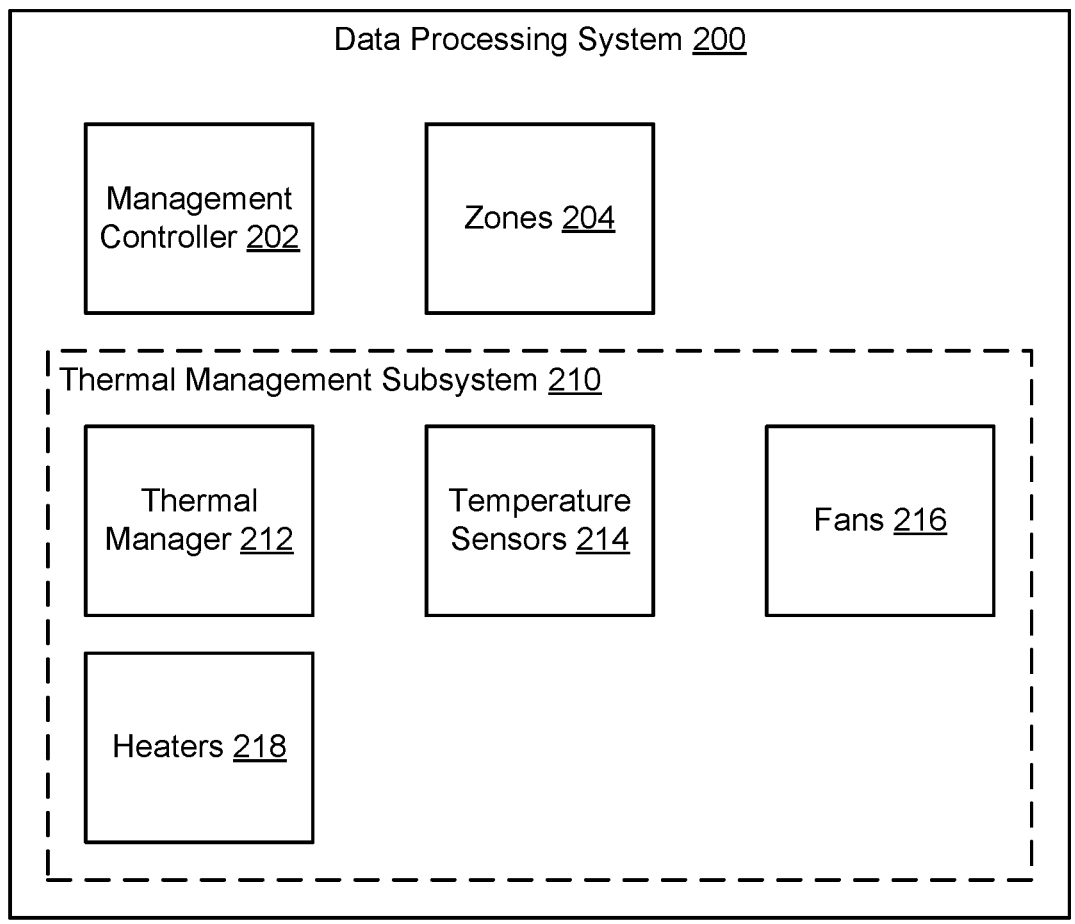
FIG. 2 shows a block diagram illustrating a data processing system in accordance with an embodiment.
Figure 3:
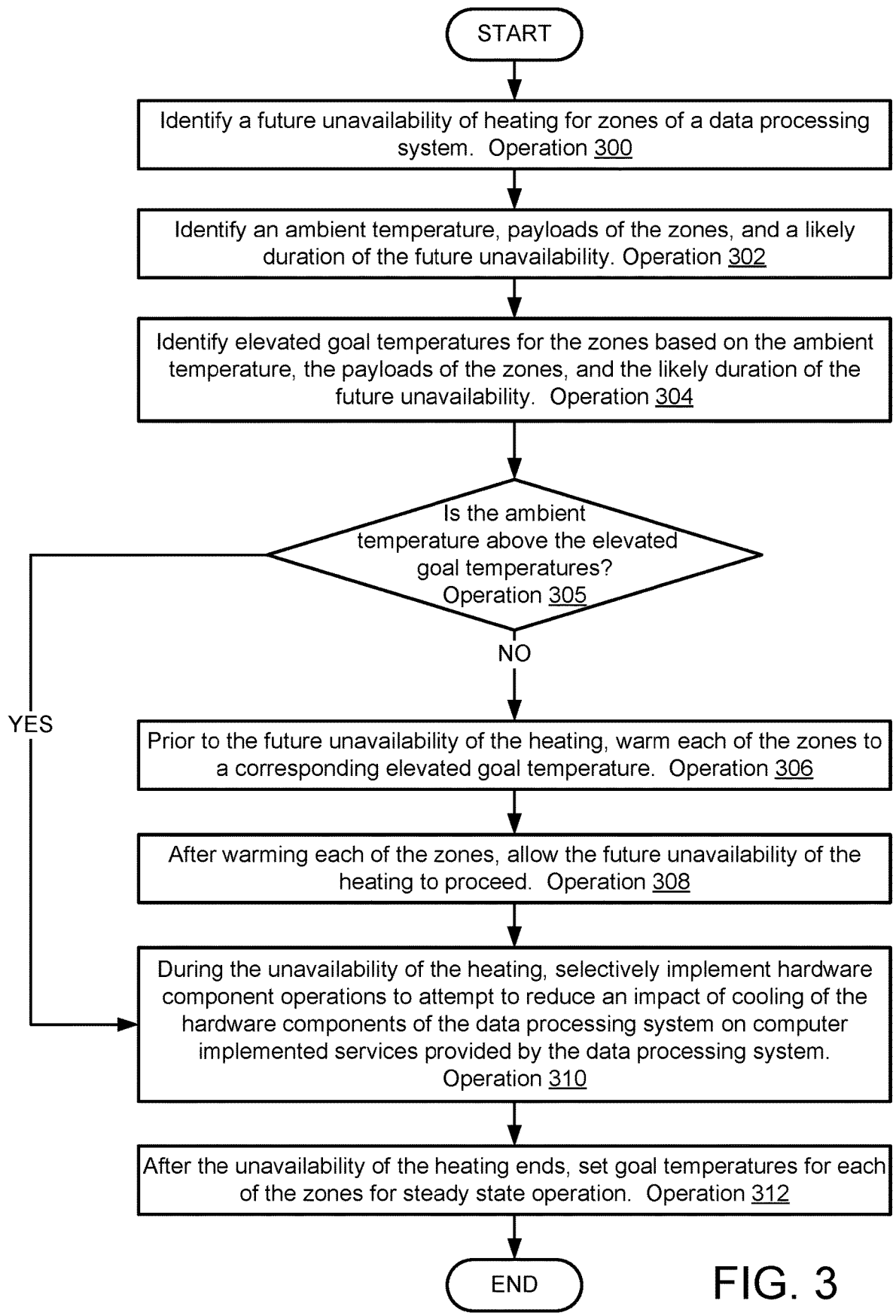
FIG. 3 shows a flow diagram illustrating a method of providing computer implemented services with a data processing system in accordance with an embodiment.

When providing their functionalities, any of data processing systems 100 may perform all, or a portion, of the method illustrated in FIG. 3. Refer to FIG. 2 for additional details regarding data processing systems.

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

As noted above, data processing systems may be positioned in ambient environments where they may be exposed to ambient temperatures outside of the operating temperature ranges of the components of the data processing systems. To facilitate operation of data processing systems in such environment, heaters may be used to place temperatures of components of data processing systems within the operating temperatures of the hardware components. FIG. 1B shows an example of airflows (e.g., flows of any types of gasses) and heaters that may be used to warm hardware components of data processing systems, and FIG. 1C shows a diagram illustrating potential transient thermal impacts due to proactive warming of hardware components to mitigate the impacts of periods of time where heating is unavailable.

Turning to FIG. 1B, a top view diagram of data processing system A 102 in accordance with an embodiment is shown. Any of data processing systems 100 may be similar to data processing system A 102.

As seen in FIG. 1B, data processing system A 102 may include any number of zones (e.g., 110, illustrated with dashed outlining). A data processing system may include any number of zones. A zone may be a portion of the data processing system. All, or a portion, of the zones may include the ability to monitor the temperature in each zone and heat each zone.

For example, zone 110 may include temperature sensor 114 (e.g., a physical sensor for measuring temperature, may include a thermocouple and/or other temperature sensor) and heater 116 (e.g., a physical heater, may include a resistive heating element). Temperature sensor 114 may be used to ascertain the temperature in zone 110, and heater 116 may be used to heat zone 110.

Each of the zones may also include a payload. For example, zone 110 may include payload 112. Payload 112 may include any number of hardware components that may provide all, or a portion, of the computer implemented services provided by data processing system A 102. Any of the hardware components may be temperature sensitive.

Any of the hardware components may be, for example, management components. Refer to FIG. 2 for additional details regarding management components.

To facilitate warming and cooling, data processing system may include intake fans (e.g., 120) usable to drawn gasses into enclosure 130 (e.g., a chassis) of data processing system A 102). The drawn gasses may form an airflow (illustrated with wavy dashed lines terminating in arrows) through the interior of enclosure 130 that facilitates thermal exchange (e.g., with heaters, payloads, temperature sensor, etc.).

While illustrated in FIG. 1B as including a specific number of zones (e.g., 4), it will be appreciated that a data processing system may include any number of zones without departing from embodiments disclosed herein. Additionally, while each of the zones are illustrated as include a payload, a temperature sensor, and a heater, it will be appreciated that each of the zones may include additional, fewer, and/or different components without departing from embodiments disclosed herein.

While illustrated in FIG. 1B with a limited number of specific components, a data processing system may include additional, fewer, and/or different components without departing from embodiments disclosed herein.

As seen in FIG. 1B, the operation of the hardware components of the payloads may be dependent on heating by heaters. However, during various periods of time, the heaters may not be operable.

Turning to FIG. 1C, a plot showing a temperature in accordance with an embodiment is shown. In FIG. 1C, the temperature may be a temperature of zone 110 as measured by temperature sensor 114 shown in FIG. 1B.

Now consider an example scenario where data processing system A 102 is positioned in an ambient environment have an ambient temperature that is less than a lower thermal limit of hardware components positioned in zone 110. To place the hardware components in condition for operation, data processing system A 102A may, upon startup, initiate heating (e.g., as part of a warming procedure) to raise the temperature of the hardware components to a steady state goal temperature that is above the lower thermal limit. Once met, the temperature of the hardware components may be maintained around the steady state goal temperature.

However, while being maintained at that the steady state goal temperature, data processing system A 102 may receive a firmware update for a management component tasked with managing the operation of heater 116 used to maintain the temperature of the hardware components. To implement the firmware update, the operation of the management component may need to be suspended resulting in an identification of a future unavailability of heating (i.e., during the period of time in which the firmware update is applied to the management component).

In response to the identification, data processing system A 102 may establish an elevated goal temperature that is likely to prevent the temperatures of the hardware components from falling below the lower thermal limit while the heating is unavailable. Once established, a supplemental warming procedure may be performed (e.g., by sending instructions to the management component) to elevate the temperature in the zone to the elevated goal temperature.

After heated to the elevated goal temperature, the heater may be disabled or otherwise disallowed from operating, and the firmware update may be applied to the management component.

As seen in FIG. 1C, the temperature in the zone may begin to fall, but the elevated goal temperature may prevent the temperature of the hardware components from falling below the lower thermal limit. In FIG. 1C, the elevated goal temperature has been set to ensure that the temperature of the hardware does not fall below the steady state goal temperature while the heating is unavailable.

After application of the firmware update is complete, heating may be resumed and the goal temperature for the zone may be reset to the steady state goal temperature.

By doing so, a data processing system may improve the likelihood of providing desired computer implemented services by proactively identifying and mitigating the impact of periods of time when heating will likely be unavailable.

Turning to FIG. 2, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may include various hardware components (e.g., processors, memory modules, storage devices, etc., not shown in FIG. 2). The hardware components may be portions of payloads positioned in any number of zones 204.

To manage its own operation, data processing system 200 may include management components (e.g., hardware components) such as management controller 202 and various subsystems such as thermal management subsystem 210 which may also include management components such as thermal manager 212. Each of these components is discussed below.

Management controller 202 may manage the operation of data processing system 200. To do so, management controller 202 may monitor the operation of data processing system 200 and take action to remediate undesired operation. As part of its functionality, management controller 202 may manage the operation of thermal management subsystem 210, including thermal manager 212.

When providing its functionality, management controller 202 may perform all or a portion of the method shown in FIG. 3.

Generally, management controller 202 may be implemented using an in-band or out-of-band management controller.

In an embodiment, management controller 202 is implemented using a hardware device including circuitry. The hardware device may be, for example, a programmable logic device, digital signal processor, a field programmable gate array, an application specific integrated circuit, or another type of hardware component usable to process data in a data processing system environment. The circuitry may be adapted to cause the hardware device to perform the functionality of management controller 202. Management controller 202 may be implemented using other types of hardware devices without departing embodiment disclosed herein.

In an embodiment, management controller 202 is implemented using a processor adapted to execute computing code stored on a persistent storage that when executed by the processor performs the functionality of management controller 202 discussed throughout this application. The processor may be a hardware processor including circuitry such as, for example, a central processing unit, a processing core, or a microcontroller. The processor may be other types of hardware devices for processing information without departing embodiment disclosed herein.

Thermal management subsystem 210 may manage the thermal state of various hardware components of data processing system 200, including the hardware components of the payloads of zones 204. To manage the thermal states, thermal management subsystem 210 include thermal manager 212, any number of temperature sensors 214 (e.g., the temperature sensors of each of zones 204), any number of fans 216 (e.g., used to generate flows of gas, as described with respect to FIG. 1B, may include intake fans and/or other types of fans positioned at other locations than illustrated in FIG. 1B), and any number of heaters 218 (e.g., the heaters of each of zones 204 and/or other heaters not shown in FIG. 1B).

Thermal manager 212 may manage the operation of the other components of thermal management subsystem 210. When doing so, thermal manager 212 may operate under the direction of management controller 202. For example, management controller 202 may provide thermal manager 212 with temperature goals for zones 204, and thermal manager 212 may manage the operation of heaters 218 and/or fans 216 to warm and/or cool zones 204 to meet the goal temperatures.

When providing its functionality, thermal manager 212 may perform all or a portion of the method shown in FIG. 3.

In an embodiment, thermal manager 212 is implemented with a programmable logic device. The programmable logic device may include firmware. From time to time, management controller 202 may update the firmware of thermal manager 212. During update, thermal manager 212 may be inoperable. Prior to and during each update, the operation of heaters 218 may be disallowed, as noted above.

In an embodiment, thermal manager 212 is implemented using a hardware device including circuitry. The hardware device may be, for example, a programmable logic device, digital signal processor, a field programmable gate array, an application specific integrated circuit, or another type of hardware component usable to process data in a data processing system environment. The circuitry may be adapted to cause the hardware device to perform the functionality of thermal manager 212. Thermal manager 212 may be implemented using other types of hardware devices without departing embodiment disclosed herein.

In an embodiment, thermal manager 212 is implemented using a processor adapted to execute computing code stored on a persistent storage that when executed by the processor performs the functionality of thermal manager 212 discussed throughout this application. The processor may be a hardware processor including circuitry such as, for example, a central processing unit, a processing core, or a microcontroller. The processor may be other types of hardware devices for processing information without departing embodiment disclosed herein.

Generally, management controller 202 and thermal manager 212 may operate independently of the host data processing system.

While illustrated in FIG. 2 with a limited number of specific components, a data processing system may include additional, fewer, and/or different components without departing from embodiments disclosed herein.

As discussed above, the components of FIGS. 1A-2 may perform various methods to increase the likelihood of data processing systems being able to provide computer implemented services. FIG. 3 illustrates a method that may be performed by the components of FIGS. 1A-2. In the diagrams discussed below and shown in these figures, any of the operations may be repeated, performed in different orders, omitted, and/or performed in parallel with or a partially overlapping in time manner with other operations.

Turning to FIG. 3, a flow diagram illustrating a method of managing the temperatures of hardware components of a data processing system in accordance with an embodiment is shown. The method may be performed, for example, by a data processing system, a thermal manager, a management controller, and/or other components illustrated in FIGS. 1A-2.

Prior to operation 300, a data processing system may have started up in an ambient environment where an ambient temperature is below a thermal operating limit of one or more hardware components of the data processing system. The data processing system may have warmed the hardware components to a goal temperature that is within the thermal operating limits of the hardware components.

At operation 300, a future unavailability of heating for zones of the data processing system is identified. The future unavailability may be identified by (i) receiving instructions (e.g., from a higher-level management entity such as a control plan) indicating that a thermal manager may need to be disabled for a period of time, (ii) identifying a need to restart/modify the operation of the thermal manager (e.g., errors in operation, health, etc.), and/or (iii) via other methods. For example, a management controller of the data processing system may obtain a firmware update for the thermal manager. Applying the firmware update (e.g., modifying computer instructions executed by the thermal manager) may require that the thermal manager be taken offline for a period of time during the update.

At operation 302, an ambient temperature is identified, payloads (and hardware components therein) of zones of the data processing system are identified, and a likely duration of the future unavailability is identified. The ambient temperature may be identified by reading a temperature sensor that is likely to measure the ambient temperature (or a temperature close to the ambient temperature), reading a stored temperature measurement that reflects the ambient temperature, and/or via other methods.

The payloads may be identified by (i) inventorying the payloads (e.g., by communicating with the various hardware components), (ii) by reading a manifest or other data structure that indicates the payloads (and hardware components thereof, and/or (iii) via other methods.

At operation 304, elevated temperatures for the zones are identified based on the ambient temperature, the payloads of the zones, and the likely duration of the future unavailability.

In an embodiment, the elevated temperature a zone of the zones is identified by (i) estimating cooling of the hardware components of the payload in the zone during the future unavailability of the heating, and (ii) adding the estimated cooling to the goal temperature for the zone to obtain the elevated goal temperature. The cooling of the hardware components may be estimated, for example, by performing a lookup using a data structure. The ambient temperature, identities (some, all, and/or a macro level designation representative of the hardware components) of the hardware components of a zone, and/or duration of the unavailability of the heating may be used as a key. The data structure (e.g., a table, list, database, linked list, etc.) may return the estimated cooling.

For example, the data structure may be populated with laboratory results where various combinations of hardware components as payloads are placed in a data processing system under various ambient conditions and heated to a goal temperature. The heating may then be removed for various duration of time (e.g., to correspond to periods of time where heating is unavailable) and a temperature drop of the hardware components may be identified. This process may be repeated for any numbers of combinations of hardware components and ambient temperature to establish relationships between ambient condition/hardware components/durations of heating unavailability and estimated cooling of the hardware components.

While described with respect to a looking, the estimated cooling may be identified via other methods without departing from embodiments disclosed herein. For example, a function may be used and may take, as input, any of the aforementioned pieces of information used to perform the lookup.

At operation 305, a determination may be made regarding whether the ambient temperature is above the elevated goal temperatures for the zones. If the ambient temperature is above the elevated goal temperatures for the zones, then the method may proceed to operation 310.

If the ambient temperature is not above the elevated goal temperatures for the zones, then the method may proceed to operation 306.

At operation 306, prior to the future unavailability of the heating, each of the zones may be warmed to the corresponding elevated goal temperature. The zones may be warmed by instructing a thermal manager to increase the goal temperature for the zones to the elevated goal temperatures. Once warmed, the thermal manager may notify a management controller that the zones have been warmed to the elevated goal temperatures.

In an embodiment, each of the zones are warmed to the corresponding elevated goal temperature. Depending on the hardware components in the zone, different elevated goal temperatures may be established. For example, different types of hardware components may have different thermal masses and may have varying thermal operating ranges. Consequently, the estimated cooling for each zone may be different and/or the steady state goal temperature for each zone may be different, thereby resulting in different elevated goal temperatures for the zones.

At operation 308, after warming each of the zones, the future unavailability of the heating is allowed to proceed. The future unavailability of the heating may be allowed by (i) disabling heaters that provide the heating, (ii) taking the thermal manager offline, and (iii) initiating performance of operations to return the thermal manager to operation. For example, to return the thermal manager to operation, a firmware update may be initiated (e.g., in a scenario where a firmware update is the cause leading to the thermal manager being taken offline, it will be appreciated that the thermal manager may be taken offline for other reasons and other operations may be performed to place it in condition for return to operation).

At operation 310, during the unavailability of the heating, hardware component operations may be selectively implemented to attempt to reduce an impact of cooling of the hardware components of the data processing system on computer implemented services provided by the data processing system. For example, the hardware components may be placed into certain operating states (e.g., an S5 state) that may reduce the impact of cooling on the ability of the hardware components to continue to operate. In another example, the hardware components may be given synthetic workloads to perform (e.g., to cause them to generate heat) during the unavailability of heating to improve the likelihood that they will remain within their thermal operating limits.

At operation 312, after the unavailability of the heating ends, goal temperatures may be set for each of the zones for steady state operation. The goal temperatures may be set by providing the thermal manager with instructions regarding the temperature at which the hardware components are to be maintained during the steady state operation. The thermal manager may then implement the goal temperatures (e.g., a steady state goal temperature as illustrated in FIG. 1C, down from the elevated goal temperature illustrated in FIG. 1C, but still above the lower thermal limit illustrated in FIG. 1C).

The method may end following operation 312.

Using the method illustrated in FIG. 3, a data processing system in accordance with embodiments may be less likely have hardware components become inoperable due to temperatures of the hardware components falling below their thermal operating ranges even during periods of time when heating is unavailable. Thus, a data processing system in accordance with embodiments disclosed herein may be more likely to provide desired computer implemented services under a wider variety of environmental conditions (e.g., even sub-zero environments).

Figure 4:
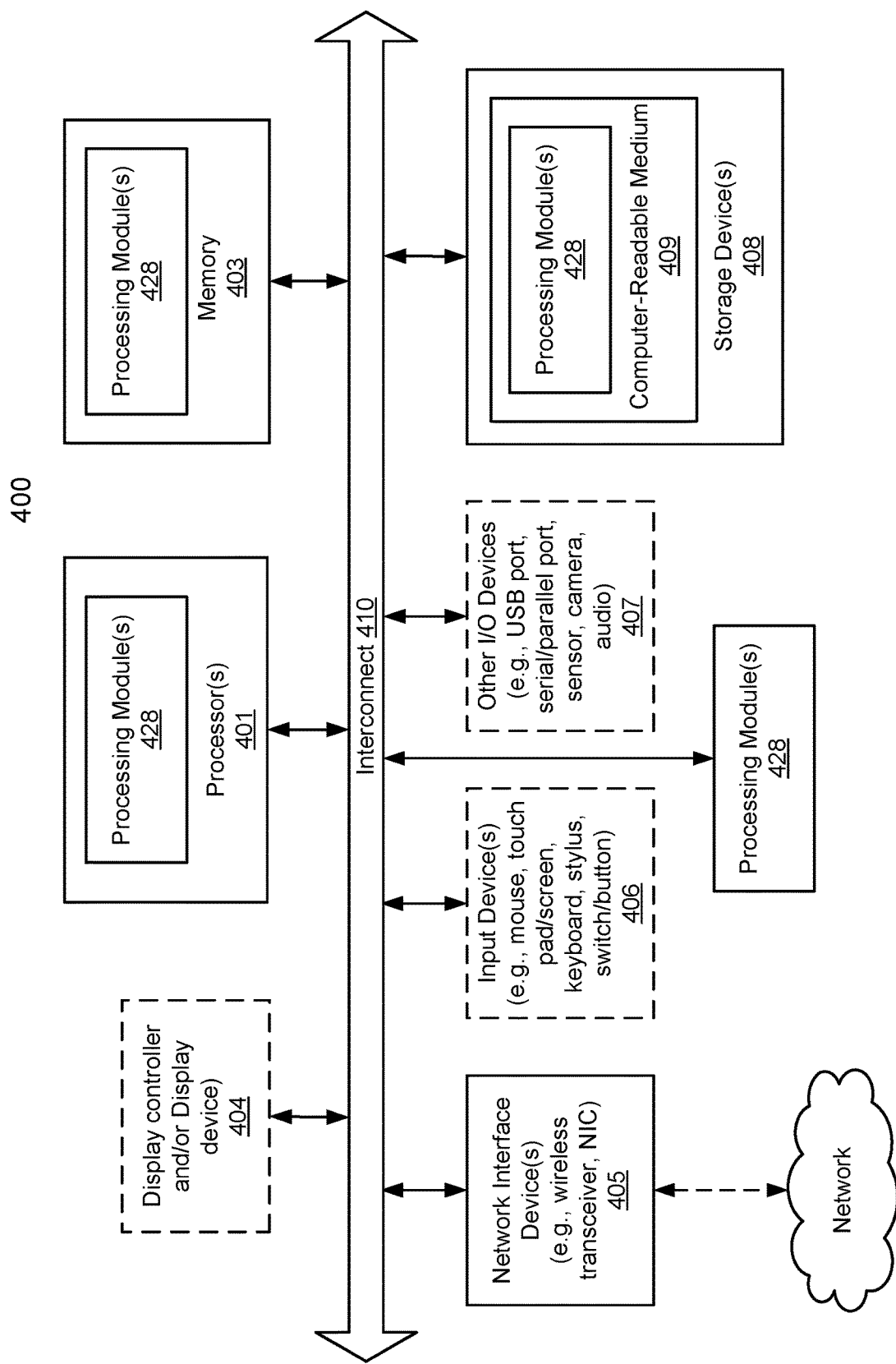
FIG. 4 shows a block diagram illustrating a computing device in accordance with an embodiment.

Any of the components illustrated in FIGS. 1A-2 may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services, the data processing system comprising:
   zones, wherein each zone of a portion of the zones comprises:
      a payload comprising hardware components that contribute to providing the computer implemented services,
      a heater positioned to warm the payload, and
      a temperature sensor positioned to identify a temperature of the zone; and
   a management controller adapted to:
      identify a future unavailability of heating for the zones by the heater of each zone;
      based on the future unavailability of the heating:
         identify an elevated goal temperature for each of the zones to obtain elevated goal temperatures;
         prior to the future unavailability of the heating, warm each zone of the zones to a corresponding elevated goal temperature of the elevated goal temperatures;
         after warming the zones, allow the future unavailability of the heating to proceed; and
         after the unavailability of the heating ends, set goal temperatures for each of the zones for steady state operation.

2. The data processing system of claim 1, further comprising:
   a thermal manager adapted to:
      control operation of the heater of each zone of the portion of the zones; and
      facilitate software updates to modify a manner in which the operation of the heater of each zone of the portion of the zones is managed,
      wherein an instance of facilitating the software updates causes the unavailability of the heating for the zones.

3. The data processing system of claim 2, wherein the management controller is unable to directly control the operation of the heater of each zone of the portion of the zones.

4. The data processing system of claim 3, wherein warming each zone of the zones comprises:
   providing, to the thermal manager, instructions to warm each of the zones to the corresponding elevated goal temperature of the elevated goal temperatures.

5. The data processing system of claim 1, wherein the management controller is further adapted to:
   during the unavailability of the heating, implement, using the hardware components, operations to attempt to reduce an impact of cooling of the hardware components on the computer implemented services provided by the data processing system.

6. The data processing system of claim 1, wherein identifying the elevated goal temperature for each of the zones to obtain the elevated goal temperatures comprises:
   identifying an ambient temperature;
   identifying the payload for each zone of the portion of the zones;
   identifying an estimated duration of the future unavailability of the heating for the zones;
   identifying an estimated level of cooling of each of the zones based on the ambient temperature, the identified payloads, and the estimated duration of the future unavailability of the heating for the zones; and
   identifying an elevated goal temperature for each zone based on a current temperature of the zone of the zones and a corresponding identified estimated level of cooling for the zone of the zones.

7. The data processing system of claim 1, wherein each of the elevated goal temperatures are higher temperatures than the goal temperatures for each of the zones for steady state operation, and a level of elevation of each of the elevated goal temperature is selected to retain a temperature in a corresponding zone of the zones within thermal operating ranges of hardware components of the payload in the corresponding zone while the hardware components cool during the unavailability of the heating.

8. A computer-implemented method for providing computer implemented services with a data processing system comprising zones, the method comprising:
   identifying, by a management controller of the data processing system, a future unavailability of heating for the zones, wherein each zone of a portion of the zones comprises:
      a payload comprising hardware components that contribute to providing the computer implemented services,
      a heater positioned to warm the payload, and
      a temperature sensor positioned to identify a temperature of the zone;
   based on the future unavailability of the heating:
      identifying, by the management controller, an elevated goal temperature for each of the zones to obtain elevated goal temperatures;
      prior to the future unavailability of the heating, warming, by the management controller, each zone of the zones to a corresponding elevated goal temperature of the elevated goal temperatures;
      after warming the zones, allowing, by the management controller, the future unavailability of the heating to proceed; and
      after the unavailability of the heating ends, setting, by the management controller, goal temperatures for each of the zones for steady state operation.

9. The computer-implemented method of claim 8, further comprising:
   controlling, by a thermal manager of the data processing system, operation of the heater of each zone of the portion of the zones; and
   facilitating, by the thermal manager, software updates to modify a manner in which the operation of the heater of each zone of the portion of the zones is managed, wherein an instance of facilitating the software updates causes the unavailability of the heating for the zones.

10. The computer-implemented method of claim 9, wherein the management controller is unable to directly control the operation of the heater of each zone of the portion of the zones.

11. The computer-implemented method of claim 10, wherein warming each zone of the zones comprises:
   providing, by the management controller and to the thermal manager, instructions to warm each of the zones to the corresponding elevated goal temperature of the elevated goal temperatures.

12. The computer-implemented method of claim 8, further comprising:
   during the unavailability of the heating, implementing, by the management controller and using the hardware components, operations to attempt to reduce an impact of cooling of the hardware components on the computer implemented services provided by the data processing system.

13. The computer-implemented method of claim 8, wherein identifying the elevated goal temperature for each of the zones to obtain the elevated goal temperatures comprises:
   identifying, by the management controller, an ambient temperature;
   identifying, by the management controller, the payload for each zone of the portion of the zones;
   identifying, by the management controller, an estimated duration of the future unavailability of the heating for the zones;
   identifying, by the management controller, an estimated level of cooling of each of the zones based on the ambient temperature, the identified payloads, and the estimated duration of the future unavailability of the heating for the zones; and
   identifying, by the management controller, an elevated goal temperature for each zone based on a current temperature of the zone of the zones and a corresponding identified estimated level of cooling for the zone of the zones.

14. The computer-implemented method of claim 8, wherein each of the elevated goal temperatures are higher temperatures than the goal temperatures for each of the zones for steady state operation, and a level of elevation of each of the elevated goal temperature is selected to retain a temperature in a corresponding zone of the zones within thermal operating ranges of hardware components of the payload in the corresponding zone while the hardware components cool during the unavailability of the heating.

15. A non-transitory machine-readable medium having instructions stored therein, which when executed by a processor, cause a data processing system to perform operations for providing computer implemented services with a data processing system comprising zones, the operations comprising:
   identifying, by a management controller of the data processing system, a future unavailability of heating for the zones, wherein each zone of a portion of the zones comprises:
      a payload comprising hardware components that contribute to providing the computer implemented services,
      a heater positioned to warm the payload, and
      a temperature sensor positioned to identify a temperature of the zone;

based on the future unavailability of the heating:
- identifying, by the management controller, an elevated goal temperature for each of the zones to obtain elevated goal temperatures;
- prior to the future unavailability of the heating, warming, by the management controller, each zone of the zones to a corresponding elevated goal temperature of the elevated goal temperatures;
- after warming the zones, allowing, by the management controller, the future unavailability of the heating to proceed; and
- after the unavailability of the heating ends, setting, by the management controller, goal temperatures for each of the zones for steady state operation.

16. The non-transitory machine-readable medium of claim 15, wherein the operations further comprise:
- controlling, by a thermal manager of the data processing system, operation of the heater of each zone of the portion of the zones; and
- facilitating, by the thermal manager, software updates to modify a manner in which the operation of the heater of each zone of the portion of the zones is managed,
- wherein an instance of facilitating the software updates causes the unavailability of the heating for the zones.

17. The non-transitory machine-readable medium of claim 16, wherein the management controller is unable to directly control the operation of the heater of each zone of the portion of the zones.

18. The non-transitory machine-readable medium of claim 17, wherein warming each zone of the zones comprises:
- providing, by the management controller and to the thermal manager, instructions to warm each of the zones to the corresponding elevated goal temperature of the elevated goal temperatures.

19. The non-transitory machine-readable medium of claim 15, wherein the operations further comprise:
- during the unavailability of the heating, implementing, by the management controller and using the hardware components, operations to attempt to reduce an impact of cooling of the hardware components on the computer implemented services provided by the data processing system.

20. The non-transitory machine-readable medium of claim 15, wherein identifying the elevated goal temperature for each of the zones to obtain the elevated goal temperatures comprises:
- identifying, by the management controller, an ambient temperature;
- identifying, by the management controller, the payload for each zone of the portion of the zones;
- identifying, by the management controller, an estimated duration of the future unavailability of the heating for the zones;
- identifying, by the management controller, an estimated level of cooling of each of the zones based on the ambient temperature, the identified payloads, and the estimated duration of the future unavailability of the heating for the zones; and
- identifying, by the management controller, an elevated goal temperature for each zone based on a current temperature of the zone of the zones and a corresponding identified estimated level of cooling for the zone of the zones.

* * * * *